(12) United States Patent
Li (10) Patent No.: US 10,972,384 B2
(45) Date of Patent: Apr. 6, 2021

(54) PROCESSING OF DATA STREAM (71) Applicant: NEW H3C TECHNOLOGIES CO., LTD., Hangzhou (CN)

(72) Inventor: Jie Li, Beijing (CN)

(73) Assignee: New H3C Technologies Co., Ltd., Hangzhou (CN)

( * ) Notice: Subject to any disclaimer, the term of this patent is extended or adjusted under 35 U.S.C. 154(b) by 325 days.

(21) Appl. No.: 16/303,117

(22) PCT Filed: Jul. 27, 2017

(86) PCT No.: PCT/CN2017/094702
§ 371 (c)(1),
(2) Date: Nov. 19, 2018

(87) PCT Pub. No.: WO2018/012970
PCT Pub. Date: Feb. 1, 2018

(65) Prior Publication Data
US 2020/0169502 A1 May 28, 2020

(30) Foreign Application Priority Data

Jul. 27, 2016 (CN) .......................... 201610606046.7
Jul. 27, 2016 (CN) .......................... 201610606047.1

(51) Int. Cl.
*H04L 12/721* (2013.01)
*H04L 12/46* (2006.01)
*H04L 12/66* (2006.01)

(52) U.S. Cl.
CPC ........ *H04L 45/566* (2013.01); *H04L 12/4633* (2013.01); *H04L 12/4641* (2013.01); *H04L 12/66* (2013.01); *H04L 45/68* (2013.01)

(58) Field of Classification Search
CPC ............... H04L 45/566; H04L 12/4633; H04L 12/4641; H04L 12/66; H04L 45/68; H04L 47/2441; H04L 29/06; H04L 45/306
See application file for complete search history.

(56) References Cited

U.S. PATENT DOCUMENTS 8,363,549 B1 * 1/2013 Zhu ..................... H04L 63/0218
370/235
2013/0163606 A1 * 6/2013 Bagepalli ............. H04L 49/356
370/409

(Continued)

FOREIGN PATENT DOCUMENTS

CN 101132304 A 2/2008
CN 101729135 A 6/2010

(Continued)

OTHER PUBLICATIONS

ISA State Intellectual Property Office of the People's Republic of China, International Search Report Issued in Application No. PCT/CN2017/094702, dated Oct. 17, 2017, WIPO, 4 pages.

(Continued)

Primary Examiner — Benjamin H Elliot, IV
(74) Attorney, Agent, or Firm — McCoy Russell LLP (57) ABSTRACT A gateway device detects whether a node corresponding to each node identifier in a node identifier chain gets on-line, the chain including node identifiers of a head node, service node via which the head node accesses tail node, and the tail node. When each node gets on-line, the gateway device distributes, as a gateway device accessed by the head node, a first stream classifying strategy associated with the chain to device hardware, and forwards a received data stream which is from the head node to the tail node according to the chain based on the first stream classifying strategy. The gateway device distributes, as a gateway device accessed by the service node, a second stream classifying strategy asso- (Continued)

ciated with the chain to the device hardware, and forwards a received data stream which is from the head node to the tail node according to the chain based on the second stream classifying strategy.

14 Claims, 6 Drawing Sheets

(56) References Cited

U.S. PATENT DOCUMENTS

| | | | | |
|---|---|---|---|---|
| 2015/0317169 | A1* | 11/2015 | Sinha | H04L 61/2076 713/2 |
| 2016/0149784 | A1* | 5/2016 | Zhang | H04B 17/00 370/229 |
| 2016/0212017 | A1* | 7/2016 | Li | H04L 41/12 |
| 2017/0012799 | A1* | 1/2017 | Jiang | H04L 45/24 |
| 2017/0019373 | A1* | 1/2017 | Meng | H04L 45/021 |
| 2017/0134275 | A1* | 5/2017 | Ni | H04L 45/306 |
| 2018/0248792 | A1* | 8/2018 | Zhou | H04L 29/08036 |
| 2019/0074995 | A1* | 3/2019 | Jiang | H04L 12/6418 |
| 2020/0169502 | A1* | 5/2020 | Li | H04L 45/306 |

FOREIGN PATENT DOCUMENTS

| | | |
|---|---|---|
| CN | 102821099 A | 12/2012 |
| CN | 102857423 A | 1/2013 |
| CN | 102957559 A | 3/2013 |
| CN | 103428771 A | 12/2013 |
| CN | 104243317 A | 12/2014 |
| CN | 104426756 A | 3/2015 |
| CN | 104506513 A | 4/2015 |
| CN | 105681218 A | 6/2016 |
| EP | 3013002 A1 | 4/2016 |
| JP | 2015154421 A | 8/2015 |
| JP | 2016046603 A | 4/2016 |
| JP | 2016092530 A | 5/2016 |
| WO | 2015161404 A1 | 10/2015 |
| WO | 2015197136 A1 | 12/2015 |

OTHER PUBLICATIONS

Quinn, P. et al., "Network Service Header," Internet Engineering Task Force Website, Available Online at https://tools.ietf.org/html/draft-ietf-sfc-nsh-05, May 26, 2016, 38 pages.

ISA State Intellectual Property Office of the People's Republic of China, Written Opinion of the International Searching Authority Issued in Application No. PCT/CN2017/094702, dated Oct. 17, 2017, WIPO, 3 pages.

European Patent Office, Extended European Search Report Issued in Application No. 17833573.3, dated May 20, 2019, Germany, 11 pages.

State Intellectual Property Office of the People's Republic of China, Office Action and Search Report Issued in Application No. 201610606047.1, dated Sep. 2, 2019, 14 pages. (Submitted with Partial Translation).

Japanese Patent Office, Office Action Issued in Application No. 2019-504773, dated Dec. 10, 2019, 10 pages. (Submitted with Machine Translation).

Japanese Patent Office, Office Action Issued in Application No. 2019-504773, dated Mar. 24, 2020, 5 pages. (Submitted with Machine Translation).

State Intellectual Property Office of the People's Republic of China, Office Action and Search Report Issued in Application No. 201610606046.7, dated Apr. 2, 2020, 13 pages. (Submitted with Machine Translation).

State Intellectual Property Office of the People's Republic of China, Office Action and Search Report Issued in Application No. 201610606046.7, dated Jul. 29, 2019, 13 pages. (Submitted with Partial Translation).

Japanese Patent Office, Decision of Refusal Issued in Application No. 2019-504773, dated Sep. 15, 2020, 6 pages. (Submitted with Machine Translation).

\* cited by examiner

PROCESSING OF DATA STREAM

CROSS REFERENCE TO RELATED APPLICATIONS

This present application is a U.S. National Phase of International Patent Application Serial No PCT/CN2017/094702 entitled "PROCESSING OF DATA STREAM," filed on Jul. 27, 2017. International Patent Application Serial No. PCT/CN2017/094702 claims priority to Chinese Patent Application No. 201610606046.7 which is filed on Jul. 27, 2016 and Chinese Patent Application No. 201610606047.1 which is filed on Jul. 27, 2016. The entire contents of each of the above-cited applications are hereby incorporated by reference in their entirety for all purposes.

BACKGROUND

A data stream may go through a variety of service nodes to be transmitted safely, fast and stably in a network. Herein, the service nodes refer to a node for providing a service to the data stream, for example, a firewall node, an intrusion detecting node, and a load balancing nodes, etc.

The service nodes which are passed by the data stream in a transmission process may form a service chain. For example, a WEB may access an APP by traversing a service chain formed by a firewall node, a load balancing node and so on.

In a Software Defined Network (SDN) service chain, on a control plane, a SDN controller distributes open flow entries for service nodes to instruct the service nodes to forward a data stream, and also distributes corresponding service forwarding strategies for the service nodes to instruct the service nodes to provide services and execute forwarding processing for the data stream. This increases the load of the SDN controller and proposes a high demand for the reliability of the SDN controller.

DETAILED DESCRIPTION OF THE EMBODIMENTS

The present disclosure will be described in detail with reference to the accompanying drawings and specific examples so that the purpose, the technical solution and the advantage of the present disclosure are clearer.

Figure 1:
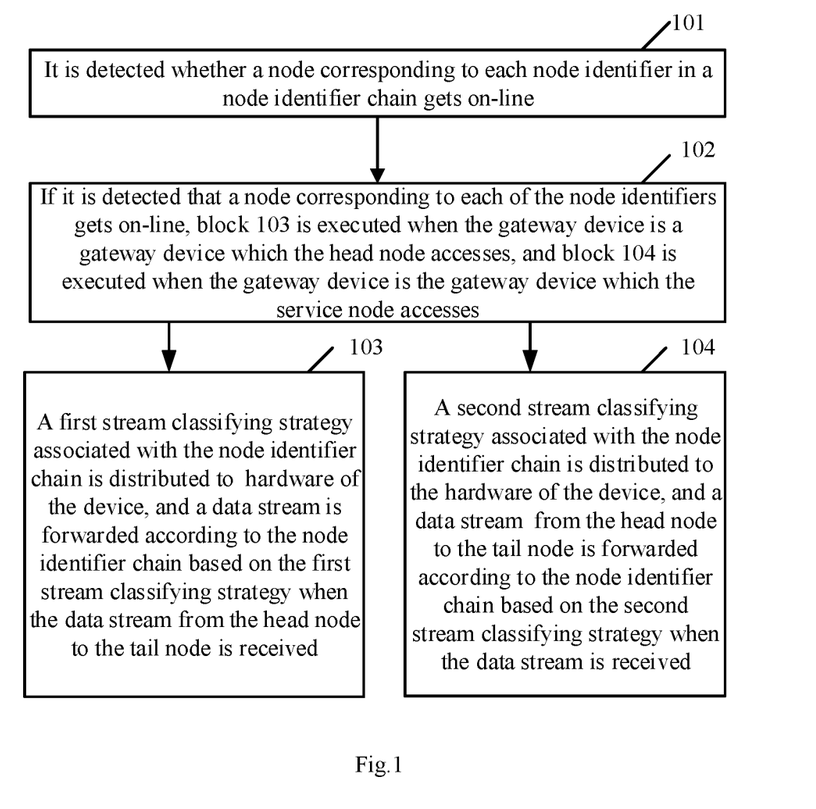
FIG. 1 illustrates a flow diagram of a method of processing a data stream according to an example of the present disclosure.

FIG. 1 is a flow diagram of a method of processing a data stream according to an example of the present disclosure. The method is applied to gateway devices via which a head node accesses a tail node. In the present disclosure, when intending to access the tail node, the head node may determine a path via which the head node accesses the tail node based on a routing protocol. The path contains the gateway devices described above as well as a series of service nodes.

In the present disclosure, the gateway devices described above may be a gateway device accessed by the head node accesses or a gateway device accessed by the service node. The gateway device accessed by the head node is not directly connected to the service node, but may be connected to the service node through the gateway device accessed by the service node. For example, in an Ethernet Virtual Private Network (EVPN), the head node here may be a Virtual Machine (VM) in the EVPN, the tail node may be another VM in the EVPN, and the gateway device may be an EVPN distribution gateway device.

Hereinafter, block 203 describes the operations performed when the gateway device is a gateway device accessed by the head node, and block 204 describes the operations performed when the gateway device is a gateway device accessed by the service node.

As shown in FIG. 1, the method of processing a data stream may include the following blocks.

At block 101: It is detected whether the node corresponding to each node identifier in a node identifier chain gets on-line.

As described above, the path via which the head node accesses the tail node contains the gateway devices described above and one or more service nodes. Based on this, in the present disclosure, the node identifier of the head node, the node identifiers of the service nodes contained in the path, and the node identifier of the tail node are connected in series to form the node identifier chain. The node identifier of each node may uniquely characterize the node. For example, an IP address, a MAC address, etc., of a node may be used as a node identifier. In the present disclosure, the node identifier chain has a unique identifier, and matches a data stream passing from the head node through the tail node. The service nodes which are sequentially passed by the data stream may be regarded as a service chain, and the service nodes are numbered in sequence on the service chain.

In an example of the present disclosure, it may be detected whether a node corresponding to each node identifier in the node identifier chain gets online based on an existing Address Resolution Protocol (ARP) or an Internet Control Message Protocol (ICMP). The specific detecting manner is similar to the detection on whether a node gets online, and not described in detail.

At block 102: If it is detected that a node corresponding to each of the node identifiers gets on-line, block 103 is executed when the gateway device is a gateway device accessed by the head node, and block 104 is executed when the gateway device is a gateway device accessed by the service node.

At block 103: A first stream classifying strategy associated with the node identifier chain is distributed to hardware of the device itself, and a data stream is forwarded according to the node identifier chain based on the first stream classifying strategy when the data stream is received.

In an example of the present disclosure, the first stream classifying strategy may be pre-configured on a software layer of the present device. In another example, the first stream classifying strategy may be pre-acquired from a SDN controller and stored on the device software layer.

In an example, the device software layer described above may be a software unit such as a memory of the device, and the device hardware described above may be a hardware unit such as a forwarding chip. It is to be noted that the device software layer and the device hardware are only described as an example here, which will not be limited by the present disclosure.

In the block 103, the data stream is forwarded according to the node identifier chain based on the first stream classifying strategy, including the following blocks.

At block A1: The node identifier chain that matches the data stream is found.

As an example, an ACL rule may be set in advance, which contains feature parameters of the data stream and the identifier of the node identifier chain. The feature parameters may include a quintuple of the data stream (a source IP address, a destination IP address, a source port number, a destination port number, a port protocol), and a source MAC address and a destination MAC address of the data stream, which will not be defined specifically in the present disclosure. Based on the description of the example, in the block A1, by using the feature parameters carried by the data stream as a keyword to acquire an ACL rule, the ACL rule containing the keyword may be acquired from all the ACL rules. A node identifier chain corresponding to the identifier of the node identifier chain carried in the acquired ACL rule may be determined as the node identifier chain that matches the data stream. The matching node identifier chain is the above node identifier chain.

At block A2: The identifier of the matching node identifier chain is encapsulated for the data stream.

Figure 2:
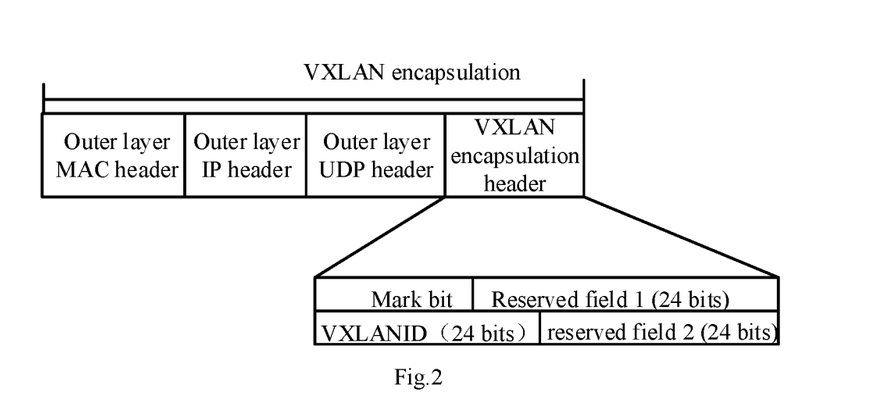
FIG. 2 illustrates a schematic diagram of a VXLAN encapsulation according to an example of the present disclosure.

In an example, when the present disclosure is applied to an EVPN, the identifier of the node identifier chain is encapsulated for the data stream by means of a Virtual Extensible Local Area Network (VXLAN) encapsulation header in the block A1. For example, the VXLAN encapsulating header is added into the data stream, where a reserved field in the VXLAN encapsulation header carries the identifier of the node identifier chain. This implements the operation of encapsulating the identifier of the node identifier chain for the data stream. As shown in FIG. 2, the reserved field 1 in the VXLAN encapsulation header carries the identifier of the node identifier chain.

At block A2: The data stream encapsulated with the identifier of the node identifier chain is also redirected to a gateway device that satisfies the following condition that: a service node corresponding to a second node identifier on the node identifier chain is accessed.

The above service node corresponding to the second node identifier on the node identifier chain is a first service node.

For the gateway device accessed by the head node, based on the stream classifying strategy, a data stream may be redirected to the gateway device accessed by the first service node. Then, the gateway device accessed by the head node may determine an egress port. For example, the identifier of the first service node (i.e., the second node identifier on the node identifier chain) may be learned from the node identifier chain, and the corresponding egress port may be searched for according to the second node identifier. The node identifier may be an IP address or a MAC address. The egress port for forwarding data may be searched for according to the IP address or the MAC address, which may be implemented by various ways and will not be described in the present disclosure.

After acquiring the egress port, the data stream encapsulated with the identifier of the node identifier chain may be forwarded, through the egress port, to a corresponding gateway device, that is, the gateway device accessed by the first service node.

After the gateway device accessed by the head node forwards the data stream encapsulated with the identifier of the node identifier chain in block A2, the gateway device accessed by the first service node receives the data stream encapsulated with the identifier of the node identifier chain through a pseudo-wire (PW) port.

At block 104: A second stream classifying strategy associated with the node identifier chain is distributed to the hardware of the device, and when the data stream is received, the data stream may be forwarded according to the node identifier chain based on the second stream classifying strategy.

In an example of the present disclosure, the second stream classifying strategy may be pre-configured at the software layer of the device. As another example, the second stream classifying strategy may be pre-acquired from a SDN controller and stored at the device software layer.

For example, in the block 104, the data stream may be forwarded according to the node identifier chain based on the second stream classifying strategy, including the following blocks.

At block B1: when the data stream is received through a PW port of the device, block B2 is executed; and when the data stream is received through a service port connecting a service node of the device, block B3 is executed.

At block B2: The node identifier chain which corresponds to the identifier of the node identifier chain encapsulated in the data stream is acquired, the data stream is de-encapsulated, and the de-encapsulated data stream is sent to a service node corresponding to the second node identifier in the acquired node identifier chain.

When the gateway device accessed by the service node receives the data stream through the PW port, based on the description of the above block A2, it may be concluded that the data stream is sent from the gateway device accessed by the head node. The data stream may subject to a VXLAN de-encapsulation so as to obtain a raw data stream sent by the head node. Based on the identifier of the node identifier chain encapsulated for the data stream, the node identifier chain corresponding to the identifier may be found. Then the raw data stream is sent to a service node corresponding to the second node identifier in the found node identifier chain. In this way, the raw data stream may be introduced to the service node. When the service processing for the data stream is completed, the service node sends the processed data stream to the gateway device accessed by the service node.

The data stream which is received, through a PW port, by the gateway device accessed by the service node may also carry information of the service node, such as the number, the IP address or the MAC address of the service node. As above described in the block A1, the gateway device accessed by the head node may determine the first service node for processing the data stream, so that the gateway device may encapsulate the information about the first service node into the data stream when sending the data stream. For example, the reserved field 2 in the VXLAN encapsulation header shown in FIG. 2 may carry the number of the service node. Of course, the number, the address and other information of the service node may also be sent in other ways. In this way, the gateway device accessed by the service node may determine the corresponding service node according to the information of the service node and the node identifier chain, so as to introduce the data stream into the service node. Taking that the data stream carries the number of the service node as an example, if the number is 1, it indicates that the data stream is to be introduced into the first service node, and the gateway device accessed by the service node may acquire the identifier of the service node from the node identifier chain. The node identifier may be an IP address or a MAC address. According to the IP address or the MAC address, an egress port on the device may be searched for so that the raw data stream is sent to the first service node through the egress port.

At block B3: When the data stream is received through a service port connecting the service node (as above described in the block B2, it indicates that the data stream is sent by the service node), the node identifier chain matching the data stream may be searched for. Then a next-hop identifier may be determined according to the acquired node identifier chain. When the next-hop identifier is the node identifier of the tail node, the data stream is redirected to the gateway device accessed by the tail node. Otherwise, the data stream is sent to the service node corresponding to the next-hop identifier. The next-hop identifier is a node identifier next to the current service node identifier on the node identifier chain, and the current service node identifier is an identifier of the service node connecting the service port.

It is to be noted that the above example is based on the situation that all the service nodes on a service chain are connected to the same gateway device. There is also a situation that the service nodes on the service chain access a plurality of gateway devices. Correspondingly, in the block B2, the data stream which is received, through the PW port, by the gateway device accessed by the service node may also be sent from the gateway devices accessed by other service nodes. The data stream may also carry information of a service node. In conjunction with the description of the block B3, it may be seen that: when the next-hop node identifier is determined, the gateway device may determine whether the next-hop node (service node) accesses the device itself. If the service node corresponding to the next-hop node identifier accesses other gateway device, the data stream is to be sent to the other gateway device. And wherein, the manner used for sending the data stream is substantially the same as in the block A2, except for that the data stream is to be redirected to the gateway device accessed by the determined next-hop service node. Correspondingly, the data stream being sent out may carry the information of the next-hop service node, and the gateway device receiving the data stream may use the same process manner as in the block B2.

Through the flow shown in FIG. 1, it may be seen that the service nodes via which the head node accesses the tail node only perform network service on the data stream without encapsulating the data stream, which saves the hardware entry resources.

Hereinafter, take EVPN as an example to illustrate the flow shown in FIG. 1.

Figure 3:
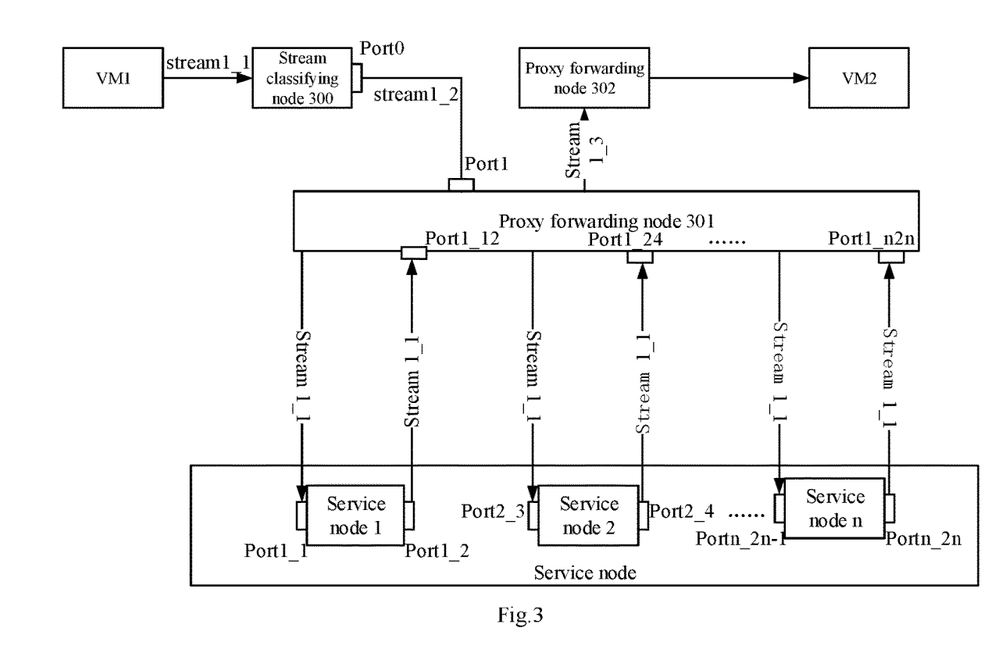
FIG. 3 illustrates a networking diagram according to an example of the present disclosure.

FIG. 3 illustrates a networking diagram according to an example of the present disclosure. In the networking shown in FIG. 3, a VM1 accessing a VM2 is taken as an example, where the VM1 is a head node, and the VM2 is a tail node.

When the VM1 accesses the VM2, it is determined based on a routing protocol that the VM1 accesses the VM2 sequentially via service nodes 1 to n.

Based on this, in the present example, the identifier of the VM1, the identifiers of the service nodes 1 to n traversed when the VM1 accesses the VM2, and the identifier of the VM2 are connected in series to form a node identifier chain that the VM1 accesses the VM2. The node identifier chain connected in series here is denoted as chain 1.

Assume the identifier of the VM1 is an IP address of the VM1 (denoted as IP0), the identifier of the VM2 is an IP address of the VM2 (denoted as IP(2n+1)). Assume the node identifier of the service node 1 is [IP1, IP2], IP1 is the identifier of an ingress port on the service node 1 of an access path via which the VM1 accesses the VM2, and IP2 is the identifier of an egress port on the service node 1 of the access path via which the VM1 accesses the VM2. Assume the node identifier of the service node 2 is [IP3, IP4], IP3 is the identifier of an ingress port on the service node 2 of the access path via which the VM1 accesses the VM2, and IP4 is the identifier of an egress port on the service node 2 of the access path via which the VM1 accesses the VM2. Similarly, assume the node identifier of the service node n is [IP(2n−1), IP(2n)], IP(2n−1) is the identifier of an ingress port on the service node n of the access path via which the VM1 accesses the VM2, and IP(2n) is the identifier of an egress port on the service node n of the access path via which the VM1 accesses the VM2. In FIG. 3, the chain 1 is specifically:

IP0-IP1-IP2-IP3-IP4 . . . -IP(2n−1)-IP(2n)-IP(2n+1).

In FIG. 3, the above access path via which the VM1 accesses the VM2 will also pass through a stream classifying node 300, a proxy forwarding node 301, and a proxy forwarding node 302. Herein, the stream classifying node 300, the proxy forwarding node 301, and the proxy forwarding node 302 are equivalent to an EVPN distribution gateway device. The stream classifying node 300 may be a gateway device accessed by the head node VM1, the proxy forwarding node 301 may be a gateway device accessed by the service node, and the proxy forwarding node 302 may be a gateway device accessed by the tail node.

In the present example, the stream classifying node 300 and the proxy forwarding node 301 pre-configure the chain 1. In the present example, the proxy forwarding node 302 is the last proxy forwarding node which is passed by when the VM1 accesses the VM2. Since the proxy forwarding node 302 is directly connected to a destination end VM2, it is sufficient that the data stream is capable of being normally forwarded to the destination end VM2. In the present example, the proxy forwarding node 302 may not pre-configure the chain 1.

The stream classifying node 300 and the proxy forwarding node 301 detect whether the devices corresponding to each IP address on the chain 1, i.e., the VM1, the service nodes 1 to n, and the VM2 all get on-line since they do not get on-line in the beginning.

When the stream classifying node 300 detects that the devices corresponding to each IP address on the chain 1, i.e., the VM1, the service nodes 1 to n, and the VM2, all get on-line, a stream classifying strategy associated with the chain 1 is distributed to the hardware of the node. The distributed stream classifying strategy is denoted as the stream classifying strategy 1 for directing the data stream from the VM1 to the VM2 to be forwarded according to the chain 1. For example, the stream classifying strategy 1 is as follows: search for the matching node identifier chain based on the feature parameters such as the source IP address and the destination IP address carried in the data stream, encapsulate the identifier of the chain 1 for the data stream, and redirect the data stream to a proxy forwarding node that satisfies a condition. The condition is that the service node (service node 1) corresponding to a second node identifier (IP1) in the chain 1 is connected with the proxy forwarding node. Herein, the proxy forwarding node satisfying the condition is the proxy forwarding node 301.

When the proxy forwarding node 301 detects that the devices corresponding to each IP address on the chain 1, i.e., the VM1, the service nodes 1 to n, and the VM2, all get on-line, a stream classifying strategy associated with the chain 1 is distributed to the hardware of the node. The stream classifying strategy here is used for directing the data stream to be forwarded according to the chain 1, and may include a stream classifying strategy 2 and a stream classifying strategy 3. The stream classifying strategy 2 is as follows: acquire the node identifier chain corresponding to the identifier of the node identifier chain encapsulated for the data stream when the data stream is received through a PW port of the device, de-encapsulate the data stream, and send the de-encapsulated data stream to a service node corresponding to the second node identifier in the node identifier chain, i.e., the service node 1 described above. The stream classifying strategy 3 is as follows: search for the matching node identifier chain based on the feature parameters such as the source IP address and the destination IP address carried in the data stream when the data stream is received through a service port connecting a service node of the device, determine a next-hop identifier according to the node identifier chain, and redirect the data stream to the gateway device accessed by the tail node (proxy forwarding node 302) when the next-hop identifier is the node identifier of the tail node (such as IP(2n+1)), otherwise, send the data stream to the service node corresponding to the next-hop identifier. The next-hop identifier is a node identifier next to the identifier of a current service node on the node identifier chain, and the identifier of the current service node is the identifier of the service node to which the service port is connected.

After the VM1 gets on-line, the VM1 sends the data stream accessing the VM2. The source IP address of the data stream sent by the VM1 accessing the VM2 is the IP address of the VM1, i.e., IP0 and its destination IP address is the IP address of the VM2, i.e., IP(2n+1). For convenience of description, the data stream is denoted as stream 1_1 here.

The stream classifying node 300 receives the stream 1_1.

The stream classifying node 300 acquires a matching node identifier chain from node identifier chains stored on the stream classifying node 300 based on the feature parameters such as the source IP address IP0 and the destination IP address IP(2n+1) carried by the stream 1_1. The acquired node identifier chain is the chain 1 described above, (IP0-IP1-IP2-IP3-IP4- . . . -IP(2n−1)-IP(2n)-IP(2n+1)).

The stream classifying node 300 adds a VXLAN encapsulation header to the stream 1_1. For example, the VXLAN encapsulation header is as shown in FIG. 3. The reserved field 1 in the VXLAN encapsulation header carries the identifier of the acquired node identifier chain, i.e. chain 1. For convenience of description, the stream 1_1 in which the VXLAN encapsulation header is added is denoted as stream 1_2.

The stream classifying node 300 determines an egress port through which the stream 1_2 is forwarded. The egress port is a port through which the stream classifying node is connected to the following proxy forwarding node: an proxy forwarding node connecting with the service node 1 corresponding to the first service node identifier IP1 in the acquired node identifier chain, i.e. chain 1 (the proxy forwarding node actually is the proxy forwarding node 301 in FIG. 4). For convenience of description, the determined egress port is denoted as Port0 here.

The stream 1_2 is redirected by the stream classifying node 300 to the determined egress port0 to be forwarded.

The proxy forwarding node 301 receives the stream 1_2 through the PW port of the proxy forwarding node 301 (denoted as Port1).

The proxy forwarding node 301 determines the identifier of the node identifier chain carried by the VXLAN encapsulation header of the stream 1_2 based on the stream classifying strategy 2 and acquires a node identifier chain having the determined identifier of the node identifier chain from node identifier chains stored on the proxy forwarding node 301. The acquired node identifier chain is the chain 1 described above, (IP0-IP1-IP2-IP3-IP4- . . . -IP(2n−1)-IP(2n)-IP(2n+1)).

The proxy forwarding node 301 performs VXLAN de-encapsulation on the stream 1_2, so as to recover the above stream 1_1.

The proxy forwarding node 301 sends the recovered stream 1_1 to the service node 1 corresponding to the first service node identifier IP1 in the acquired node identifier chain, i.e., the chain 1.

The service node 1 receives the stream 1_1 sent by the proxy forwarding node 301, through a port corresponding to IP1 (denoted as Port1_1) and processes the stream 1_1 according to a service strategy stored on the service node 1.

The service node 1 sends the processed stream 1_1 to the proxy forwarding node 301 through a port corresponding to IP2 (denoted as Port1_2).

The proxy forwarding node 301 receives the stream 1_1 through a port connecting the Port1_2 described above (denoted as Port1_12).

The proxy forwarding node 301 acquires the node identifier chain that matches the feature parameters such as the source IP address IP0 and the destination IP address IP(2n+1) carried by the stream 1_1, based on the stream classifying strategy 3. The acquired node identifier chain is the chain 1 described above, (IP0-IP1-IP2-IP3-IP4- . . . -IP(2n−1)-IP(2n)-IP(2n+1)).

The proxy forwarding node 301 determines the next-hop identifier based on the acquired chain 1 and through the following blocks:

determining that the identifier corresponding to the port Port1_2 on the service node 1 connecting the port Port1_12 is IP2. In the present example, the proxy forwarding node 301 will pre-learn an identifier corresponding to a port on a service node connecting each service port of the proxy forwarding node 301. Based on this, the proxy forwarding node 301 determines the identifier corresponding to the port Port1_2 on the service node 1 based on the learned identifier corresponding to each port; and determining a node identifier next to the IP2 (i.e., IP3) in the acquired chain 1, (IP0-IP1-IP2-IP3-IP4- . . . -IP(2n−1)-IP(2n)-IP(2n+1)), as the next-hop identifier.

The proxy forwarding node 301 sends the stream 1_1 to a service node (i.e., the service node 2) corresponding to the next-hop identifier IP3.

The service node 2 receives the stream 1_1 sent by the proxy forwarding node 301, through a port corresponding to IP3 (denoted as Por2_3) and processes the stream 1_1 according to the service strategy stored on the service node 2.

The service node 2 sends the processed stream 1_1 to the proxy forwarding node 301 through a port corresponding to IP4 (denoted as Port2_4).

The proxy forwarding node 301 receives the stream 1_1 through a port connecting Port 2_4 on the service node 2 (denoted as Port1_24).

The proxy forwarding node 301 acquires the node identifier chain that matches the feature parameters such as the source IP address IP0 and the destination IP address IP(2n+1) carried by the stream 1_1, based on the stream classifying strategy 3. The acquired node identifier chain is the chain 1 described above, (IP0-IP1-IP2-IP3-IP4- . . . -IP(2n−1)-IP(2n)-IP(2n+1)).

The proxy forwarding node 301 determines the next-hop identifier based on the acquired chain 1 and through the following blocks:
determining that an identifier corresponding to the port Port2_4 on the service node 2 connecting the port Port1_24 as IP4; and
determining a service node identifier next to the IP4 (i.e., IP5) in the acquired chain 1, (IP0-IP1-IP2-IP3-IP4- . . . -IP(2n−1)-IP(2n)-IP(2n+1)), as the next-hop identifier.

The proxy forwarding node 301 sends the stream 1_1 to a service node corresponding to the next-hop identifier IP5. Similarly, the proxy forwarding node 1 will finally send the stream 1_1 to the service node n.

The service node n receives the stream 1_1 sent by the proxy forwarding node 301, through a port corresponding to IP(2n−1) (denoted as Portn_2n−1), and processes the received stream 1_1 according to the service strategy stored on the service node n.

The service node n sends the processed stream 1_1 to the proxy forwarding node 301 through a port corresponding to IP(2n) (denoted as Portn_2n).

The proxy forwarding node 301 receives the stream 1_1 through a port connecting Portn_2n on the service node n (denoted as Port1_n2n).

The proxy forwarding node 301 acquires the node identifier chain from the node identifier chains stored on the proxy forwarding node 301 according to the feature parameters such as the source IP address IP0 and the destination IP address IP(2n+1) carried by the stream 1_1. The acquired node identifier chain is the chain 1 described above, (IP0-IP1-IP2-IP3-IP4- . . . -IP(2n−1)-IP(2n)-IP(2n+1)).

The proxy forwarding node 301 determines the next-hop identifier based on the acquired chain 1 and through the following blocks:
determining an identifier corresponding to the port Portn_n2n on the service node n connecting the port Port1_n2n is IP(2n); and
determining a service node identifier next to the IP(2n) (i.e., IP(2n+1)) in the acquired chain 1, (IP0-IP1-IP2-IP3-IP4- . . . -IP(2n−1)-IP(2n)-IP(2n+1)), as the next-hop identifier.

The proxy forwarding node 301 performs VXLAN encapsulation on the stream 1_1. The VXLAN encapsulation here does not contain the identifier of the chain 1 any longer, and is similar to the existing VXLAN encapsulation. The stream 1_1 that has been subjected to the VXLAN encapsulation is denoted as stream 1_3.

The proxy forwarding node 301 sends the stream 1_3 through an egress port connecting the proxy forwarding node 302 (the gateway device accessed by the tail node VM2).

The proxy forwarding node 302 receives the stream 1_3 sent by the proxy forwarding node 301, and performs VXLAN de-encapsulation on the stream 1_3 so as to recover the above stream 1_1.

The proxy forwarding node 302 may forward the recovered stream 1_1 directly to the VM2, and finally the VM2 will receive the data stream from the VM1.

It is to be noted that in the example described above, all the service nodes in a service chain are connected to the same proxy forwarding node as an example. This is only a particular example taken for the sake of description, and is not intended to limit the present disclosure. On the premise of realizing the purpose of the present disclosure, different service nodes may also be connected to different proxy forwarding nodes through expansion.

It is to be noted that, in the example shown in FIG. 3, after the devices corresponding to each IP address on the chain 1 such as the VM1, the service nodes 1 to n, and the VM2 get online, the stream classifying node 300 and the proxy forwarding node 301 also need to further detect whether the devices corresponding to each IP address on the chain 1 i.e. the VM1, the service nodes 1 to n, and the VM2 get off-line. When the stream classifying node 300 detects that at least one of the devices corresponding to each IP address on the chain 1 i.e. the VM1, the service nodes 1 to n, and the VM2 gets off-line, a first stream classifying strategy in local hardware is deleted.

Similarly, when the proxy forwarding node 302 detects that at least one of the devices corresponding to each IP address on the chain 1 i.e. the VM1, the service nodes 1 to n, and the VM2 gets off-line, a second stream classifying strategy in local hardware is deleted.

According to the above technical solution, it may be seen that in the present disclosure, the forwarding of the data stream of the gateway device accessed by the head node is improved by the node identifier chain and the first stream classifying strategy associated with the node identifier chain; the forwarding of the data stream of the gateway device accessed by the service node is improved by the node identifier chain and the second stream classifying strategy associated with the node identifier chain, and finally the gateway device accessed by the head node accesses and the gateway device accessed by the service node are combined with each other to direct the data stream to be forwarded according to the node identifier chain, rather than control and instruct the forwarding of the data stream by a SDN controller. On the one hand, this reduces the load of the SDN controller, proposes a low demand on the reliability of the SDN controller, and avoids the defect due to that the SDN controller distributes a service forwarding strategy at each service node passed by the data stream.

Hereinabove, a method of processing data on a service chain is introduced. However, when a service node on the service chain is faulty, it will lead to failure of the entire service chain, affecting the network service of data stream.

Based on this, in the present disclosure, each service node may be provided with a corresponding service group which includes at least one back-up service node in addition to the service node. Both the service node and the back-up service node may provide the same service, and may back up a service strategy from each other.

Figure 4:
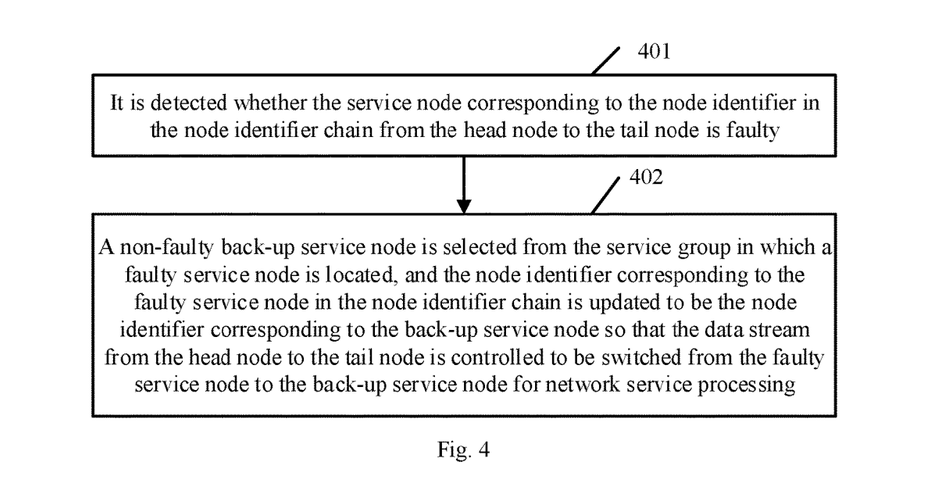
FIG. 4 illustrates another flow diagram of a method of processing a data stream according to an example of the present disclosure.

FIG. 4 illustrates another flow diagram of a method of processing a data stream according to an example of the present disclosure. The method of processing a data stream may be applied to gateway devices accessed by each node on a service chain.

At block 401: It is detected whether the service node corresponding to the node identifier in the node identifier chain is faulty.

Different service nodes in the same service group have different priorities, where the priorities of the service nodes in the service group are statically configured or are determined dynamically by the order of installation into the service group. Based on this, the node identifier of one of the service nodes in the service group in the node identifier chain in the block 401 may be: the node identifier of the service node with the highest priority selected from the service group according to a load balancing principle.

In an example, the detection performed in the block 401 on whether the service node corresponding to the node identifier in the node identifier chain is faulty may be executed in real time. When it is detected that none service node corresponding to the node identifier in the node identifier chain is faulty, the data stream is forwarded according to the node identifier chain. However, when it is detected that the service node corresponding to the node identifier in the node identifier chain is faulty, the block 402 is executed.

At block 402: A non-faulty back-up service node is selected from the service group in which the faulty service node is located, and the node identifier corresponding to the faulty service node in the node identifier chain is updated to be the node identifier corresponding to the selected back-up service node. Thus, the data stream is controlled to be switched from the faulty service node to the back-up service node for network service processing.

Different service nodes in the same service group may have different priorities. Based on this, a non-faulty back-up service node is selected from the service group to which a faulty service node belongs, including: selecting a non-faulty back-up service node with the highest priority from the service group to which a faulty service node belongs according to the load balancing principle.

As an example, in the block 402, the node identifier corresponding to the faulty service node in the node identifier chain is updated to be the node identifier corresponding to the back-up service node, including the following blocks:

At block a1: It is determined whether the faulty service node and the back-up service node access the same gateway device. If so, block a2 is executed, and if not, block a3 is executed;

At block a2: When the gateway device is a gateway device accessed by both the faulty service node and the back-up service node, the node identifier corresponding to the faulty service node in the node identifier chain is updated to be the node identifier corresponding to the back-up service node; otherwise, the gateway device accessed by both the faulty service node and the back-up service node is triggered to update the node identifier corresponding to the faulty service node in the node identifier chain to be the node identifier corresponding to the back-up service node; and At block a3: The gateway device accessed by the back-up service node accesses and the gateway device associated with the faulty service node are controlled to update the node identifier corresponding to the faulty service node in the node identifier chain to be the node identifier corresponding to the back-up service node.

As an example, herein, the gateway device associated with the faulty service node may be determined by the following blocks: determining a previous hop and a next hop of the faulty service node according to the node identifier chain; determining that the gateway device associated with the faulty service node is the gateway device accessed by the head node when the previous hop is the head node and the next hop is the tail node; determining that the gateway device associated with the faulty service node includes the gateway device accessed by the head node accesses and the gateway device accessed by the next hop when the previous hop is the head node and the next hop is the service node; and determining that the gateway device associated with the faulty service node is the gateway device accessed by the previous hop when the next hop is the tail node and the previous hop is the service node.

It is to be noted that, in an example, the gateway device performing the above method may be a gateway device selected from the gateway devices, which are accessed by the nodes corresponding to each node identifier on the above node identifier chain. That is, when implemented, the above gateway device may be the gateway device accessed by the head node accesses, or the gateway device accessed by the service node via which the head node accesses the tail node, or the gateway device accessed by the tail node.

Figure 5:
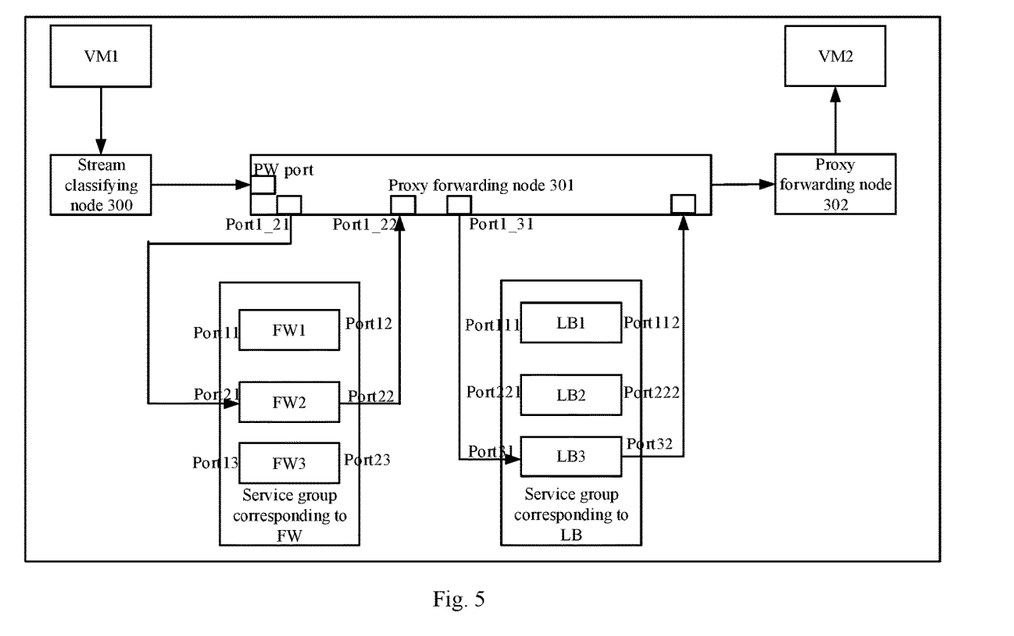
FIG. 5 illustrates a schematic diagram of an application according to an example of the present disclosure.

The method of processing a data stream when a faulty service node exists on a service chain will be described below with reference to FIG. 5. FIG. 5 illustrates a networking diagram according to an example of the present disclosure. As shown in FIG. 5, the service group corresponding to the service node 1 may provide FW service, which is referred to as a FW service group; and the service group corresponding to the service node 2 may provide LB service, which is referred to as a LB service group. The FW service group contains three service nodes: FW1, FW2, and FW3. The FW1, the FW2, and the FW3 back up a FW network service strategy mutually, and each of the FW1, FW2, and FW3 may be used as a back-up service node. The LB service group contains three service nodes: LB1, LB2, and LB3. The LB1, the LB2, and the LB3 back up a LB network service strategy mutually, and each of the LB1, LB2, and LB3 may be used as a back-up service node.

In the present example, each service node in the service group has different priorities. Taking the FW service group as an example, the priorities of the FW1, the FW2 and the FW3 may be determined according to the order in which the FW1, the FW2 and the FW3 are installed into the FW service group. The priority of the firstly installed FW is higher than that of the later installed FW. In another example, the priority of each service node in the service group may also be randomly assigned.

In the networking shown in FIG. 5, take that VM1 accesses VM2 as an example. The VM1 is a head node, and the VM2 is a tail node.

When the VM1 accesses the VM2, an access path through which the VM1 accesses the VM2 is determined based on a routing protocol. If the access path is: the VM1→the stream classifying node 300→the proxy forwarding node 301→the FW service group→the LB service group→the proxy forwarding node 302→the VM2, based on the above access path, a node identifier chain may be determined. The node identifier chain here is: an identifier of the VM1—a node identifier of a service node in the FW service group—a node identifier of a service node in the LB service group—an identifier of the VM2.

Different service nodes in the FW service group described above have different priorities. Based on this, the node identifier of a service node in the FW service group described above may be: a node identifier of a service node with the highest priority selected from the FW service group according to a load balancing principle, which reflects that the load of different service nodes in the same service group is shared in a balanced manner.

As an example, a node identifier chain from the VM1 to the VM2 may be: an identifier of the VM1—a node identifier of the FW2—a node identifier of the LB3—an identifier of the VM2.

If the identifier of the VM1 is the IP address of the VM1 (denoted as IP1), the identifier of the VM2 is the IP address of VM2 (denoted as IP2), and if the node identifier of the FW2 is IP21 and IP22, where the IP21 is the identifier of the ingress port Port21 of the above access path on the FW2 (specifically, the IP address of the ingress port), and the IP22 is the identifier of the egress port Port22 of the above access path on the FW2 (specifically, the IP address of the egress port), and the node identifier of the LB3 is IP31 and IP32, where the IP31 is the identifier of the ingress port Port31 of the above access path on the LB3 (specifically, the IP address of the ingress port), and the IP32 is the identifier of the egress port Port32 of the above access path on the LB3 (specifically, the IP address of the egress port), the node identifier chain is: IP1-IP21-IP22-IP31-IP32-IP2.

In the present example, for convenience of description, IP1-IP21-IP22-IP31-IP32-IP2 is referred to as a first chain. The first chain is pre-configured on the stream classifying node 300 and the proxy forwarding node 301.

After all the devices corresponding to each IP in the first chain, i.e., the VM1, the FW2, the LB3, and the VM2, get on-line, the stream classifying node 300 acquires and distributes a first stream classifying strategy to the hardware of the node. After all the devices corresponding to each identifier in the first chain, i.e., the VM1, the FW2, the LB3, and the VM2, all get on-line, the proxy forwarding node 301 acquires and distributes a second stream classifying strategy to the hardware of the node.

In the present example, it is assumed that the proxy forwarding node 301 via which the VM1 accesses the VM2 is selected to execute the flow shown in FIG. 4, the stream classifying node and the proxy forwarding node 302 are selected in a similar manner.

After the service nodes corresponding to each node identifier in the first chain, i.e., the FW2 and the LB3, get on-line, the proxy forwarding node 301 detects in real time whether the service nodes corresponding to each node identifier in the first chain, i.e., the FW2 and the LB3, are faulty.

When the FW2 and the LB3 are not faulty, the data stream from the VM1 to the VM2 will pass through the stream classifying node 300. According to the first stream classifying strategy, the stream classifying node 300 encapsulates a first chain identifier for the data stream and redirects the data stream encapsulated with the first chain identifier to the proxy forwarding node 301 connecting the service node FW2 corresponding to the first node identifier IP21 in the first chain. When receiving the data stream encapsulated with the first chain identifier through a PW port of the proxy forwarding node 301, the proxy forwarding node 301 de-encapsulates the data stream to obtain the first chain identifier, and redirects the de-encapsulated data stream to the service node (FW2) corresponding to the first node identifier (IP21) in the first chain, based on the first chain identifier. The FW2 provides FW service processing to the received data stream based on a FW service strategy stored on the FW2 and sends the processed data stream through a port i.e. the port Port22 corresponding to the IP22. The proxy forwarding node 301 receives the data stream through a service node port Port1_22 (connecting the port Port22 corresponding to the IP22 in the first chain), redirects the data stream to the service node (LB3) corresponding to a node identifier (IP31) next to the IP22 in the first chain, based on the second stream classifying strategy. The LB3 provides LB service processing to the received data stream based on a LB service strategy stored on the LB3 and sends the processed data stream through a port i.e. the port Port32 corresponding to IP32. The proxy forwarding node 301 receives the data stream through a service node port Port1_32 (connecting the port Port32 corresponding to the IP32 in the first chain), redirects the received data stream to the proxy forwarding node 302 to which the tail node is connected, based on a third stream classifying strategy. Finally, the proxy forwarding node 302 sends the received data stream to the tail node. That is, the data stream from the VM1 to the VM2 finally arrives at the VM2 after subjected to the FW service and the LB service.

When the proxy forwarding node 301 detects that the FW2 is faulty, the proxy forwarding node 301 selects a non-faulty service node with the highest priority from the FW service group in which the FW2 is located according to the load balancing principle. Here, the FW1 is taken as an example.

The proxy forwarding node 301 determines whether the faulty FW2 and the selected non-faulty FW1 are connected to the same gateway device.

Figure 6:
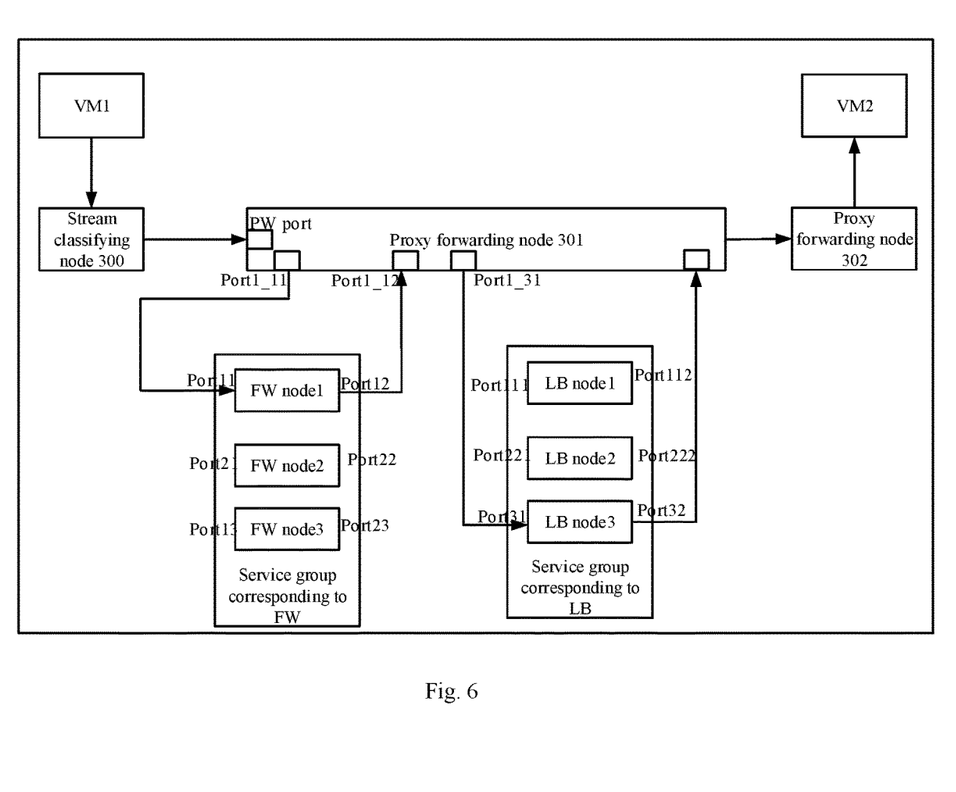
FIG. 6 illustrates a schematic diagram of another application according to an example of the present disclosure.

If the proxy forwarding node 301 determines that the FW2 and the FW1 are connected to the same gateway device and the gateway device is the proxy forwarding node 301, the IP21 and the IP22 in the first chain stored on the proxy forwarding node 301 are respectively modified to the IP11 and the IP12. The updated first chain is: IP1-IP11-IP12-IP31-IP32-IP2. At the same time, the proxy forwarding node 301 will automatically update the second stream classifying strategy associated with the faulty FW2 based on the updated first chain. The updated second stream classifying strategy is as follows: when the data stream from the VM1 to the VM2 is received through the PW port, de-encapsulate the data stream to obtain the first chain identifier, and redirect the de-encapsulated data stream to the service node (FW1) corresponding to the second node identifier (IP11) in the first chain according to the first chain identifier; and when the data stream is received through the service node port Port1_12, redirect the data stream to the service node (LB3) corresponding to a node identifier (IP31) next to the IP22 in the first chain. Based on the updated second stream classifying strategy, the final forwarding path of the data stream is as shown in FIG. 6.

It is to be noted that when the proxy forwarding node 301 determines that the FW2 and the FW1 are connected to the same gateway device but the gateway device is not the proxy forwarding node 301, the proxy forwarding node 301 triggers the gateway device accessed by both the FW2 and the FW1 to modify the IP21 and the IP22 in the first chain to be the IP11 and the IP12, respectively. Specifically, the triggering example is as follows: sending an update notification to the gateway device accessed by both the faulty service node and the non-faulty service node, and the update notification is used to notify for modifying the IP21 and the IP22 in the first chain stored on the device to be the IP11 and the IP12, respectively. The gateway device accessed by both the FW2 and the FW1 will automatically acquire and distribute a stream classifying strategy associated with the updated first chain, based on the updated first chain (similar to distributing a stream classifying strategy by the above proxy forwarding node 301, which will not be described in details).

It is also to be noted that if the proxy forwarding node 301 determines that the FW2 and the FW1 are connected to different gateway devices, when the gateway device accessed by the FW1 accesses (denoted as the proxy forwarding node 303, not shown in the figure) stores the first chain therein, the proxy forwarding node 301 triggers the proxy forwarding node 303 to modify the node identifiers IP21 and IP22 of the faulty FW2 in the stored first chain to be the node identifiers IP11 and IP12 of the FW1; and when the proxy forwarding node 303 does not store the first chain therein, the proxy forwarding node 301 modifies the node identifiers IP21 and IP22 of the faulty FW2 in the first chain to be the node identifiers IP11 and IP12 of the FW1, and send the updated first chain to the proxy forwarding node 303 for storing. The proxy forwarding node 303 will automatically acquire and distribute a stream classifying strategy associated with the FW1 based on the updated first chain (similar to distributing a stream classifying strategy by the above proxy forwarding node 1, which will not be described in details).

Moreover, the proxy forwarding node 301 determines a previous hop and a next hop of the FW2 in the first chain. The proxy forwarding node 301 determines that the previous hop is the node identifier IP1 of the head node, and the next hop is the node identifier (IP31, IP32) corresponding to the LB3, rather than the node identifier IP2 of the tail node. On the one hand, The proxy forwarding node 301 triggers the gateway device (here, the proxy forwarding node 301 as an example) accessed by the next hop (IP31, IP32) to modify the node identifier IP21 and IP22 of the faulty FW2 in the first chain stored on the device to be the node identifier IP11 and IP12 of the FW1. On the other hand, the proxy forwarding node 301 notifies the stream classifying node 300 to modify the node identifier IP21 and IP22 corresponding to the faulty FW2 in the first chain to be the node identifiers IP11 and IP12 corresponding to the FW1. The proxy forwarding node 301 will automatically update the second stream classifying strategy associated with the faulty FW2 stored on the proxy forwarding node 301 based on the updated first chain, the details of which is described above. The stream classifying node 300 will further update the first stream classifying strategy after modifying the node identifiers IP21 and IP22 corresponding to the faulty FW2 in the first chain to be the node identifiers IP11 and IP12 corresponding to the FW1. The updated first stream classifying strategy is to encapsulate the first chain identifier for the data stream and redirect the data stream to the proxy forwarding node connecting the service node (FW1) corresponding to the first node identifier (IP11) in the first chain.

Thereafter, the proxy forwarding node 301 detects whether the service nodes (the FW1 and the LB3) corresponding to each node identifier in the updated first chain are faulty.

When the proxy forwarding node 301 detects that the LB3 is faulty, the proxy forwarding node 301 selects a non-faulty service node with the highest priority from the LB service group in which the LB3 is located according to the load balancing principle. Here, the LB2 is taken as an example.

Figure 7:
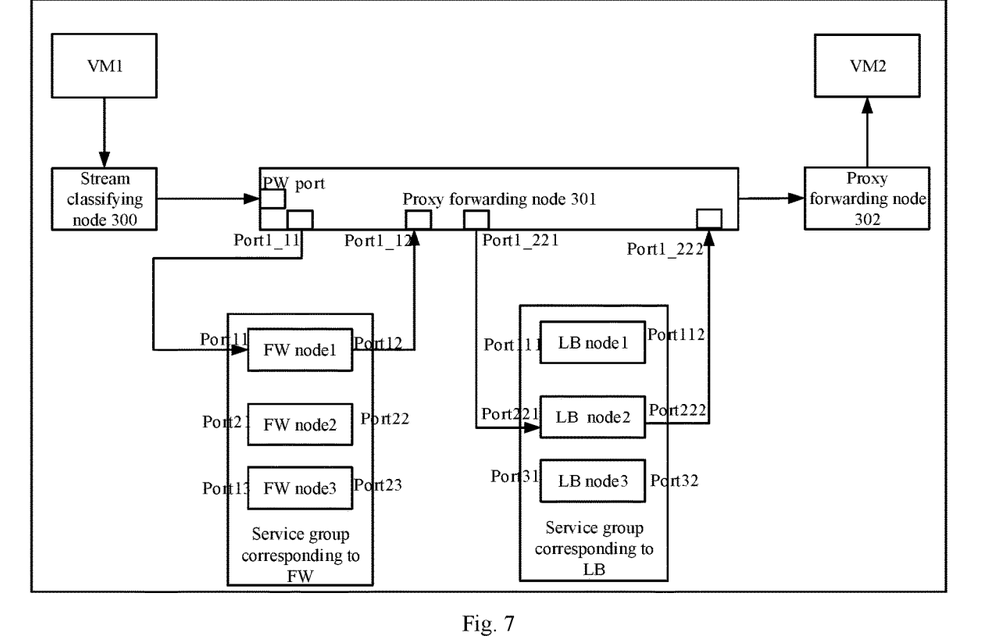
FIG. 7 illustrates a schematic diagram of still another application according to an example of the present disclosure.

When determining that the faulty LB3 and the non-faulty LB2 are connected to the same gateway device and the gateway device is the proxy forwarding node 301, the proxy forwarding node 301 may modify the node identifier IP31 and IP32 corresponding to the faulty LB3 in the first chain stored on the proxy forwarding node 301 to be the node identifiers IP221 and IP222 corresponding to the LB2. The updated first chain is: IP1-IP11-IP12-IP221-IP222-IP2. Thus, the proxy forwarding node 301 may update a stream classifying strategy associated with the faulty LB3. The updated stream classifying strategy is to: when the data stream is received through the service node port Port1_12, redirect the data stream to the service node (LB2) corresponding to a node identifier (IP221) next to the IP12 in the first chain; and when the data stream is received through the service node port Port1_222, redirect the data stream to a proxy forwarding node (the proxy forwarding node 302) connecting the tail node identifier IP2 in the first chain. Finally, the proxy forwarding node 302 will send the data stream to the VM2. Based on the updated stream classifying strategy, a path of the data stream from the VM1 to the VM2 is as shown in FIG. 7.

It is to be noted that if the faulty LB3 and the non-faulty LB2 are connected to the same gateway device but the gateway device is not the proxy forwarding node 301, the proxy forwarding node 301 triggers the gateway device accessed by both the faulty LB3 and the non-faulty LB2 to modify the node identifier IP31 and the IP32 corresponding to the faulty LB3 in the first chain to be the node identifier IP221 and IP222 corresponding to the LB2. The gateway device accessed by both the faulty LB3 and the non-faulty LB2 will automatically acquire and distribute a stream classifying strategy associated with the updated first chain, based on the updated first chain (similar to distributing a stream classifying strategy by the proxy forwarding node 301 as above, which will not be described in details).

It is also to be noted that if the proxy forwarding node 301 determines that the faulty LB3 and the non-faulty LB2 are connected to different gateway devices, when the gateway device accessed by the LB2 (denoted as the proxy forwarding node 304, not shown in the figure) stores the first chain, the proxy forwarding node 301 triggers the proxy forwarding node 304 to modify the node identifier IP31 and IP32 of the faulty LB3 in the stored first chain to be the node identifier IP221 and IP222 corresponding to the LB2. And when the proxy forwarding node 304 does not store the first chain, the proxy forwarding node 301 modifies the node identifier IP31 and IP32 corresponding to the faulty LB3 in the first chain to be the node identifier IP221 and IP222 corresponding to the LB2. The proxy forwarding node 301 sends the updated first chain to the proxy forwarding node 304 for storing. Then, the proxy forwarding node 304 will automatically acquire and distribute a stream classifying strategy associated with the FW2 based on the updated first chain (similar to distributing a stream classifying strategy by the proxy forwarding node 1 as above, which will not be described in details). Finally, it is ensured that the data stream from the VM1 to the VM2 will be forwarded according to the updated first chain (IP1-IP11-IP12-IP221-IP222-IP2).

Moreover, the proxy forwarding node 301 determines a previous hop and a next hop of the LB3 in the first chain. If the proxy forwarding node 301 determines that the next hop is the node identifier IP2 of the tail node, and the previous hop is the node identifier IP11 and IP12 corresponding to the FW1, only the node identifier IP31 and IP32 corresponding to the faulty LB3 in the first chain stored by the gateway device (here, the proxy forwarding node 301 as an example) which is accessed by the previous hop (i.e., the node identifier IP11 and IP12 corresponding to the FW1) are modified to be the node identifier IP221 and IP222 corresponding to the LB2. The proxy forwarding node 301 will automatically update a stream classifying strategy associated with the updated first chain stored on the proxy forwarding node 301.

In an example of the present disclosure, when a service node corresponding to a node identifier in a node identifier chain is faulty, the node identifier of the faulty service node in the node identifier chain is updated to be the node identifier of a non-faulty back-up service node in a service group in which the faulty service node is located in time, and the data stream from the head node to the tail node is controlled to be switched from the faulty service node to the back-up service node for network service processing to ensure the continuity of network service.

A method provided according to the present disclosure has been described above. A device provided according to the present disclosure will be described below.

Figure 8:
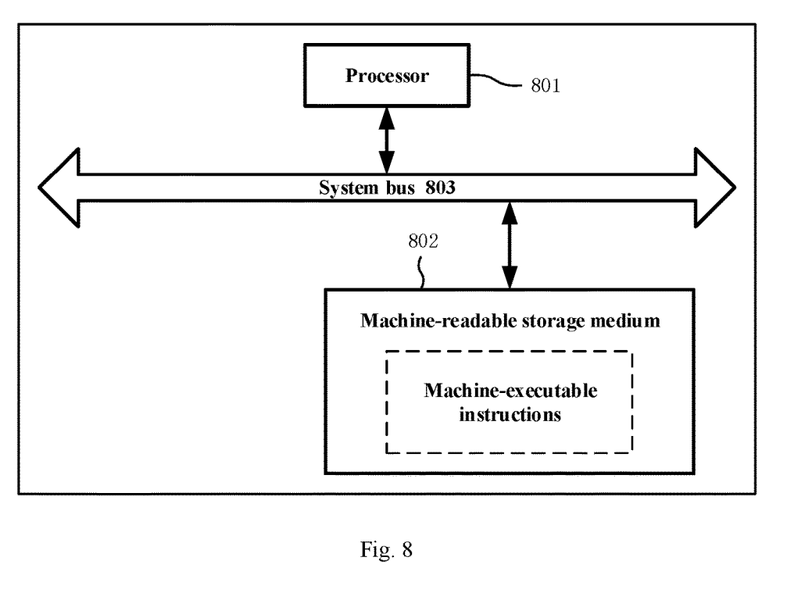
FIG. 8 illustrates a hardware structural diagram of a gateway device according to an example of the present disclosure.

FIG. 8 illustrates a hardware structural diagram of a gateway device according to an example of the present disclosure. As shown in FIG. 8, the gateway device may include:

a processor 801, and a machine-readable storage medium 802 in which machine-executable instructions are stored. The processor 801 and the machine-readable storage medium 802 may communicate with each other via a system bus 803. Moreover, the processor 801 may perform the above method of processing a data stream by reading and executing the machine-executable instructions corresponding to a data stream processing logic in the machine-readable storage medium 802.

The machine-readable storage medium 802 referred to herein may be any electronic, magnetic, optical, or other physical storage devices in which information may be contained or stored such as executable instructions, data, etc. For example, the machine-readable storage media may be: a Random Access Memory (RAM), a volatile memory, a non-volatile memory, a flash memory, a storage drive (such as a hard disk drive), a solid state drive, any type of storage discs (such as compact discs, dvds, etc.), or a similar storage media, or a combination thereof.

Figure 9:
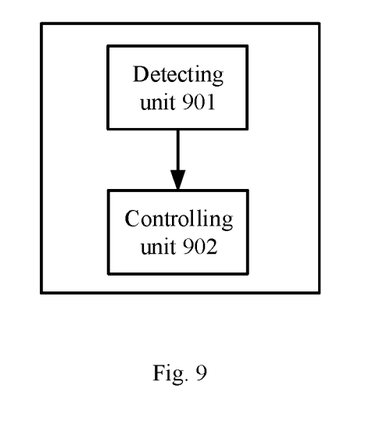
FIG. 9 illustrates a structural diagram of the device shown in FIG. 8 according to an example of the present disclosure.

As shown in FIG. 9, functionally divided, the data stream processing logic described above may include: a detecting unit 901 configured to detect whether a node corresponding to each node identifier in a node identifier chain gets on-line, where the node identifier chain includes a node identifier of a head node, node identifiers of one or more service nodes via which the head node accesses a tail node, and a node identifier of the tail node; and a controlling unit 902 configured to, when the detecting unit 901 detects that the node corresponding to each of the node identifiers gets on-line, distribute a first stream classifying strategy associated with the node identifier chain to a hardware of the device itself when the gateway device is a gateway device accessed by the head node, and forward a data stream which is from the head node to the tail node according to the node identifier chain based on the first stream classifying strategy when receiving the data stream; and distribute a second stream classifying strategy associated with the node identifier chain to the hardware of the device itself when the gateway device is a gateway device accessed by the service node, and forward the data stream according to the node identifier chain based on the second stream classifying strategy when receiving the data stream.

In an example, the first stream classifying strategy or the second stream classifying strategy is pre-configured on a device software layer; or the first stream classifying strategy or the second stream classifying strategy is pre-acquired from a SDN controller and stored on the device software layer.

In an example, the controlling unit 902 forwards the data stream according to the node identifier chain based on the first stream classifying strategy, including: acquiring the node identifier chain stored on the gateway device that matches the data stream; encapsulating the identifier of the node identifier chain for the data stream; and redirecting the data stream encapsulated with the identifier of the node identifier chain to a second gateway device which is accessed by a service node corresponding to a second node identifier on the node identifier chain.

In an example, the controlling unit 902 forwards the data stream according to the node identifier chain based on the second stream classifying strategy, including: acquiring the node identifier chain corresponding to the identifier of the node identifier chain encapsulated for the data stream stored on the gateway device when receiving the data stream through a PW port of the gateway device, de-encapsulating the data stream, and sending the de-encapsulated data stream to the service node corresponding to the second node identifier in the node identifier chain; and acquiring the node identifier chain stored on the gateway device that matches the data stream when receiving the data stream through a service port connecting a service node of the gateway device, determining a next-hop identifier according to the node identifier chain, and redirecting the data stream to the gateway device accessed by the tail node accesses when the next-hop identifier is the node identifier of the tail node, otherwise, sending the data stream to the service node corresponding to the next-hop identifier where the next-hop identifier is a node identifier next to a current service node identifier in the node identifier chain and the current service node identifier is the identifier of the service node connecting the service port.

In an example, encapsulating the identifier of the node identifier chain for the data stream includes: adding a VXLAN encapsulation header to the data stream, where a reserved field in the VXLAN encapsulation header carries the identifier of the node identifier chain.

Figure 10:
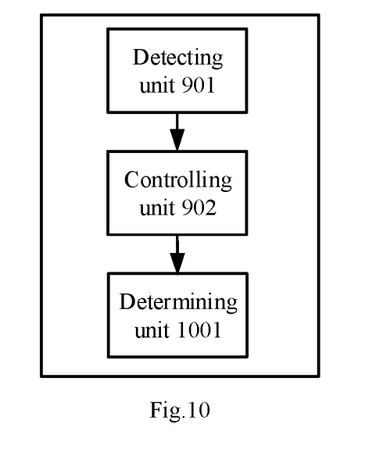
FIG. 10 illustrates another structural diagram of the device shown in FIG. 8 according to an example of the present disclosure.

As shown in FIG. 10, functionally divided, the above data stream processing logic may also include: a determining unit 1001 configured to determine whether the service node corresponding to the node identifier in the node identifier chain is faulty, where each of the service nodes belongs to a corresponding service group and each service group further includes at least one non-faulty back-up service node.

The controlling unit 902 is configured to select a non-faulty back-up service node from the service group to which a faulty service node belongs when the determining unit 1001 has detected a fault service node, and update the node identifier corresponding to the faulty service node to be the node identifier corresponding to the back-up service node so as to control the data stream to be switched from the faulty service node to the back-up service node for network service processing.

In an example, the controlling unit 902 updates the node identifier corresponding to the faulty service node in the node identifier chain to be the node identifier corresponding to the back-up service node, including: determining whether the faulty service node and the back-up service node access the same gateway device; triggering the gateway device accessed by both the faulty service node and the back-up service node to update the node identifier corresponding to the faulty service node in the node identifier chain to be the node identifier corresponding to the back-up service node if they access the same gateway device; and controlling the gateway device accessed by the back-up service node and the gateway device associated with the faulty service node to update the node identifier corresponding to the faulty service node in the node identifier chain to be the node identifier corresponding to the back-up service node if they do not access the same gateway device.

In an example, the controlling unit 902 determines the gateway device associated with the faulty service node by the following blocks: determining a previous hop and a next hop of the faulty service node according to the node identifier chain; determining that the gateway device associated with the faulty service node is the gateway device accessed by the head node when the previous hop is the head node and the next hop is the tail node; determining that the gateway device associated with the faulty service node includes the gateway device accessed by the head node and the gateway device accessed by the next hop when the previous hop is the head node and the next hop is the service node; and determining that the gateway device associated with the faulty service node is the gateway device accessed by the previous hop when the next hop is the tail node and the previous hop is the service node.

In an example, the gateway device is selected from gateway devices which are accessed by the nodes corresponding to different node identifiers in the node identifier chain.

In an example, different service nodes in the same service group have different priorities; and a back-up service node is selected from the service group to which the faulty service node belongs, including that: a non-faulty back-up service node with the highest priority is selected from the service group to which the faulty service node belongs according to a load balancing principle.

The foregoing is merely illustrative of the preferred examples of the present disclosure and is not intended to limit the present disclosure. Any modifications, equivalent substitutions, improvements, etc., made within the spirit and principle of the present disclosure shall be encompassed in the scope of protection of the present disclosure.

The invention claimed is:

1. A method of processing a data stream, the method comprising: detecting, by a gateway device, whether a node corresponding to each node identifier in a node identifier chain gets on-line, wherein the node identifier chain comprises a node identifier of a head node, node identifiers of one or more sequent service nodes via which the head node accesses a tail node, and a node identifier of the tail node; and in case that the node corresponding to each of the node identifiers gets on-line, distributing, by the gateway device, a first stream classifying strategy associated with the node identifier chain to hardware of the gateway device when the gateway device is a gateway device accessed by the head node, and forwarding, by the gateway device, the data stream which is from the head node to the tail node according to the node identifier chain based on the first stream classifying strategy when the data stream is received; and distributing, by the gateway device, a second stream classifying strategy associated with the node identifier chain to the hardware of the gateway device when the gateway device is a gateway device accessed by the service node, and forwarding, by the gateway device, the data stream which is from the head node to the tail node according to the node identifier chain based on the second stream classifying strategy when the data stream is received.

2. The method according to claim 1, wherein either of the first stream classifying strategy and the second stream classifying strategy is pre-configured on a software layer of the gateway device; or the first stream classifying strategy or the second stream classifying strategy is acquired from a Software Defined Network (SDN) controller and stored on the software layer of the gateway device.

3. The method according to claim 1, wherein forwarding the data stream according to the node identifier chain based on the first stream classifying strategy, comprises: acquiring, by the gateway device, the node identifier chain stored on the gateway device that matches the data stream; encapsulating, by the gateway device, an identifier of the node identifier chain into the data stream; and redirecting, by the gateway device, the data stream encapsulated with the identifier of the node identifier chain to a gateway device which is accessed by a service node corresponding to a second node identifier in the node identifier chain.

4. The method according to claim 1, wherein forwarding the data stream according to the node identifier chain based on the second stream classifying strategy comprises: when the data stream is received through a Pseudo-Wire (PW) port of the gateway device, acquiring, by the gateway device, of the node identifier chain stored on the gateway device which corresponds to the identifier of the node identifier chain encapsulated into the data stream, de-encapsulating, by the gateway device, the data stream, and sending, by the gateway device, the de-encapsulated data stream to a service node corresponding to a second node identifier in the node identifier chain; and when the data stream is received through a service port connecting a service node of the gateway device, acquiring, by the gateway device, the node identifier chain stored on the gateway device that matches the data stream, determining, by the gateway device, a next-hop identifier according to the node identifier chain, and redirecting, by the gateway device, the data stream to a gateway device accessed by the tail node when the next-hop identifier is the node identifier of the tail node, and sending, by the gateway device, the data stream to a service node corresponding to the next-hop identifier when the next-hop identifier is not the node identifier of the tail node.

5. The method according to claim 1, wherein each of the service nodes belongs to a corresponding service group and each service group further comprises at least one back-up service node, wherein the method further comprises: when detecting that the service node corresponding to the node identifier in the node identifier chain is faulty, selecting, by the gateway device, a non-faulty back-up service node from the service group to which the faulty service node belongs, and updating, by the gateway device, the node identifier corresponding to the faulty service node in the node identifier chain to be the node identifier corresponding to the selected back-up service node in a way that the data stream from the head node to the tail node is switched from the faulty service node to the back-up service node.

6. The method according to claim 5, wherein updating the node identifier corresponding to the faulty service node to be the node identifier corresponding to the selected back-up service node comprises: in case that both the faulty service node and the back-up service node access a same gateway device, triggering, by the gateway device, the gateway device accessed by both the faulty service node and the back-up service node to update the node identifier corresponding to the faulty service node in the node identifier chain to be the node identifier corresponding to the back-up service node; and in case that the faulty service node and the back-up service node access different gateway devices, controlling, by the gateway device, the gateway device accessed by the non-faulty service node and the gateway device associated with the faulty service node to update the node identifier corresponding to the faulty service node in the node identifier chain to be the node identifier corresponding to the back-up service node.

7. The method according to claim 6, the method further comprising: determining, by the gateway device, a previous hop and a next hop of the faulty service node according to the node identifier chain; determining, by the gateway device, that the gateway device associated with the faulty service node is the gateway device accessed by the head node when the previous hop is the head node and the next hop is the tail node; determining, by the gateway device, that the gateway device associated with the faulty service node includes the gateway device accessed by the head node and the gateway device accessed by the next hop when the previous hop is the head node and the next hop is the service node; and determining, by the gateway device, that the gateway device associated with the faulty service node is the gateway device accessed by the previous hop when the next hop is the tail node and the previous hop is the service node.

8. A gateway device comprising: a processor; and a non-transitory storage medium storing machine-executable instructions which are executable by the processor to: detect whether a node corresponding to each node identifier in a node identifier chain gets on-line, wherein the node identifier chain comprises a node identifier of a head node, node identifiers of one or more sequent service nodes via which the head node accesses a tail node, and a node identifier of the tail node; and in case that the node corresponding to each of the node identifiers gets on-line, distribute a first stream classifying strategy associated with the node identifier chain to hardware of the gateway device when the gateway device is a gateway device accessed by the head node, and forward the data stream which is from the head node to the tail node according to the node identifier chain based on the first stream classifying strategy when the data stream is received; and distribute a second stream classifying strategy associated with the node identifier chain to the hardware of the gateway device when the gateway device is a gateway device accessed by the service node, and forward, by the gateway device, the data stream which is from the head node to the tail node according to the node identifier chain based on the second stream classifying strategy when the data stream is received.

9. The gateway device according to claim 8, wherein either of the first stream classifying strategy and the second stream classifying strategy is pre-configured on a software layer of the gateway device; or the first stream classifying strategy or the second stream classifying strategy is acquired from a Software Defined Network (SDN) controller and stored on the software layer of the gateway device.

10. The gateway device according to claim 8, wherein when forwarding the data stream according to the node identifier chain based on the first stream classifying strategy, the processor is caused by the machine-executable instructions to: acquire the node identifier chain stored on the gateway device that matches the data stream; encapsulate an identifier of the node identifier chain into the data stream; and redirect the data stream encapsulated with the identifier of the node identifier chain to a gateway device which is accessed by a service node corresponding to a second node identifier in the node identifier chain.

11. The gateway device according to claim 8, wherein when forwarding the data stream according to the node identifier chain based on the second stream classifying strategy, the processor is caused by the machine-executable instructions to: when the data stream is received through a Pseudo-Wire (PW) port of the gateway device, acquire the node identifier chain stored on the gateway device which corresponds to the identifier of the node identifier chain encapsulated into the data stream, de-encapsulate the data stream, and send the de-encapsulated data stream to a service node corresponding to a second node identifier in the node identifier chain; and when the data stream is received through a service port connecting a service node of the gateway device, acquire the node identifier chain stored on the gateway device that matches the data stream, determine a next-hop identifier according to the node identifier chain, and redirect the data stream to a gateway device accessed by the tail node when the next-hop identifier is the node identifier of the tail node, and send the data stream to a service node corresponding to the next-hop identifier when the next-hop identifier is not the node identifier of the tail node.

12. The gateway device according to claim 8, wherein each of the service nodes belongs to a corresponding service group and each service group further comprises at least one back-up service node, the processor is caused by the machine-executable instructions to: when detecting that the service node corresponding to the node identifier in the node identifier chain is faulty, select a non-faulty back-up service node from the service group to which the faulty service node belongs, and update the node identifier corresponding to the faulty service node in the node identifier chain to be the node identifier corresponding to the selected back-up service node so as to control the data stream from the head node to the tail node to be switched from the faulty service node to the back-up service node.

13. The gateway device according to claim 12, wherein when updating the node identifier corresponding to the faulty service node to be the node identifier corresponding to the selected back-up service node, the processor is further caused by the machine-executable instructions to: in case that both the faulty service node and the back-up service node access a same gateway device, trigger the gateway device accessed by both the faulty service node and the back-up service node to update the node identifier corresponding to the faulty service node in the node identifier chain to be the node identifier corresponding to the back-up service node; and in case that the faulty service node and the back-up service node access different gateway devices, control the gateway device accessed by the non-faulty service node and the gateway device associated with the faulty service node to update the node identifier corresponding to the faulty service node in the node identifier chain to be the node identifier corresponding to the back-up service node.

14. The gateway device according to claim 13, wherein the processor is further caused by the machine-executable instructions to: determine a previous hop and a next hop of the faulty service node according to the node identifier chain; determine that the gateway device associated with the faulty service node is the gateway device accessed by the head node when the previous hop is the head node and the next hop is the tail node; determine that the gateway device associated with the faulty service node includes the gateway device accessed by the head node and the gateway device accessed by the next hop when the previous hop is the head node and the next hop is the service node; and determine that the gateway device associated with the faulty service node is the gateway device accessed by the previous hop when the next hop is the tail node and the previous hop is the service node.

* * * * *

UNITED STATES PATENT AND TRADEMARK OFFICE
CERTIFICATE OF CORRECTION

| | |
|---|---|
| PATENT NO. | : 10,972,384 B2 |
| APPLICATION NO. | : 16/303117 |
| DATED | : April 6, 2021 |
| INVENTOR(S) | : Jie Li |

It is certified that error appears in the above-identified patent and that said Letters Patent is hereby corrected as shown below:

On the Title Page

Item [87], Change the PCT Publication No. from "WO2018/012970" to "WO2018/019270".

Signed and Sealed this
Eighteenth Day of October, 2022

Katherine Kelly Vidal
*Director of the United States Patent and Trademark Office*